(12) United States Patent
Schoepf et al.

(10) Patent No.: US 9,416,025 B2
(45) Date of Patent: Aug. 16, 2016

(54) WATER TREATMENT AND CONVEYANCE APPARATUS

(71) Applicant: SafeSIPP, LLC, Phoenix, AZ (US)

(72) Inventors: Jared Joseph Schoepf, Phoenix, AZ (US); Taylor Lynn Barker, Mesa, AZ (US); Lindsay Fleming, Phoenix, AZ (US); Jacob Edward Arredondo, Tempe, AZ (US)

(73) Assignee: SAFESIPP, LLC, Phoenix, AZ (US)

( * ) Notice: Subject to any disclaimer, the term of this patent is extended or adjusted under 35 U.S.C. 154(b) by 3 days.

(21) Appl. No.: 14/047,972

(22) Filed: Oct. 7, 2013

(65) Prior Publication Data

US 2014/0175024 A1 Jun. 26, 2014

Related U.S. Application Data

(60) Provisional application No. 61/710,433, filed on Oct. 5, 2012.

(51) Int. Cl.

| | |
|---|---|
| *C02F 1/00* | (2006.01) |
| *A01B 29/02* | (2006.01) |
| *A01B 29/06* | (2006.01) |
| *C02F 9/00* | (2006.01) |
| *C02F 1/28* | (2006.01) |
| *C02F 1/50* | (2006.01) |
| *C02F 1/76* | (2006.01) |

(52) U.S. Cl.
CPC ............. *C02F 1/003* (2013.01); *A01B 29/02* (2013.01); *A01B 29/06* (2013.01); *C02F 9/005* (2013.01); *C02F 1/283* (2013.01); *C02F 1/50* (2013.01); *C02F 1/76* (2013.01)

(58) Field of Classification Search
CPC ............ C02F 1/002; C02F 1/003; C02F 1/50; C02F 1/283; C02F 1/76; C02F 2103/002; C02F 2201/008; C02F 2203/008; C02F 2303/04; C02F 2307/00; C02F 2307/04; C02F 9/005; A01B 29/02; A01B 29/06
See application file for complete search history.

(56) References Cited

U.S. PATENT DOCUMENTS

| | | | | |
|---|---|---|---|---|
| 2,580,084 | A | * | 12/1951 | Donnelly et al. ............. 404/130 |
| 4,218,015 | A | * | 8/1980 | Dean .............................. 239/147 |
| 2012/0031830 | A1 | * | 2/2012 | Edwards et al. .............. 210/244 |

* cited by examiner

*Primary Examiner* — Lucas Stelling
(74) *Attorney, Agent, or Firm* — Barbara J. Luther; The Luther Law Firm, PLLC

(57) ABSTRACT

A water treatment and conveyance apparatus that has a barrel with two ends, each with an indentation to accommodate a handle made of a heavy-duty material, two side members, a transverse grip member and two transverse support members that fit securely into the indentations of the barrel ends. One end of the barrel (the top) has at least one hole accommodating a removable cap, a removable inlet filter of mesh to screen out particles from entering water, and a removable outlet filter. In use, the handle is attached to both ends of the barrel in the indentations and the barrel is rolled and pulled to a water source and back to the puller's abode. After filling the barrel, a cleansing chemical such as a chlorine tablet is added to the water to help sterilize the water in transit.

17 Claims, 7 Drawing Sheets

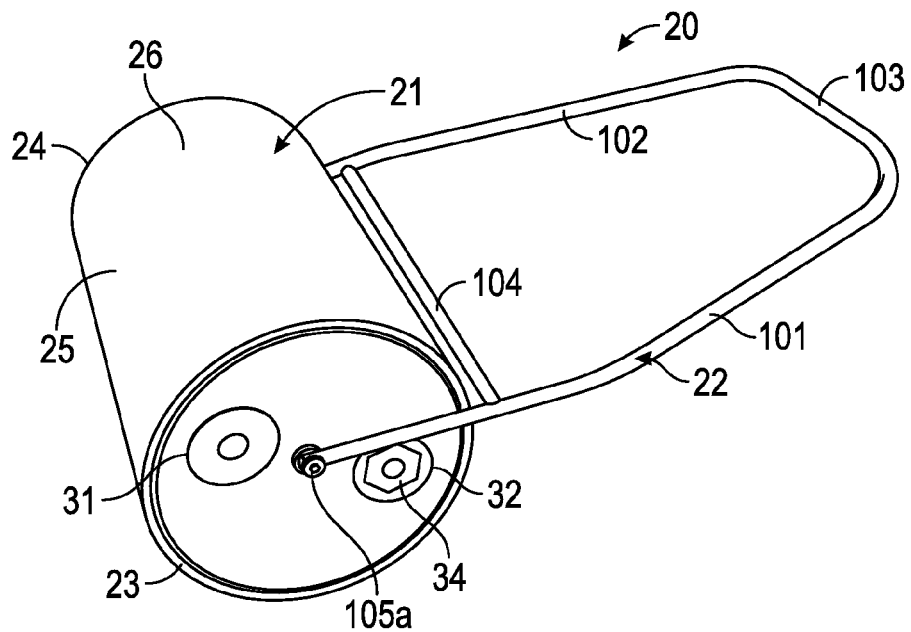
FIG. 1
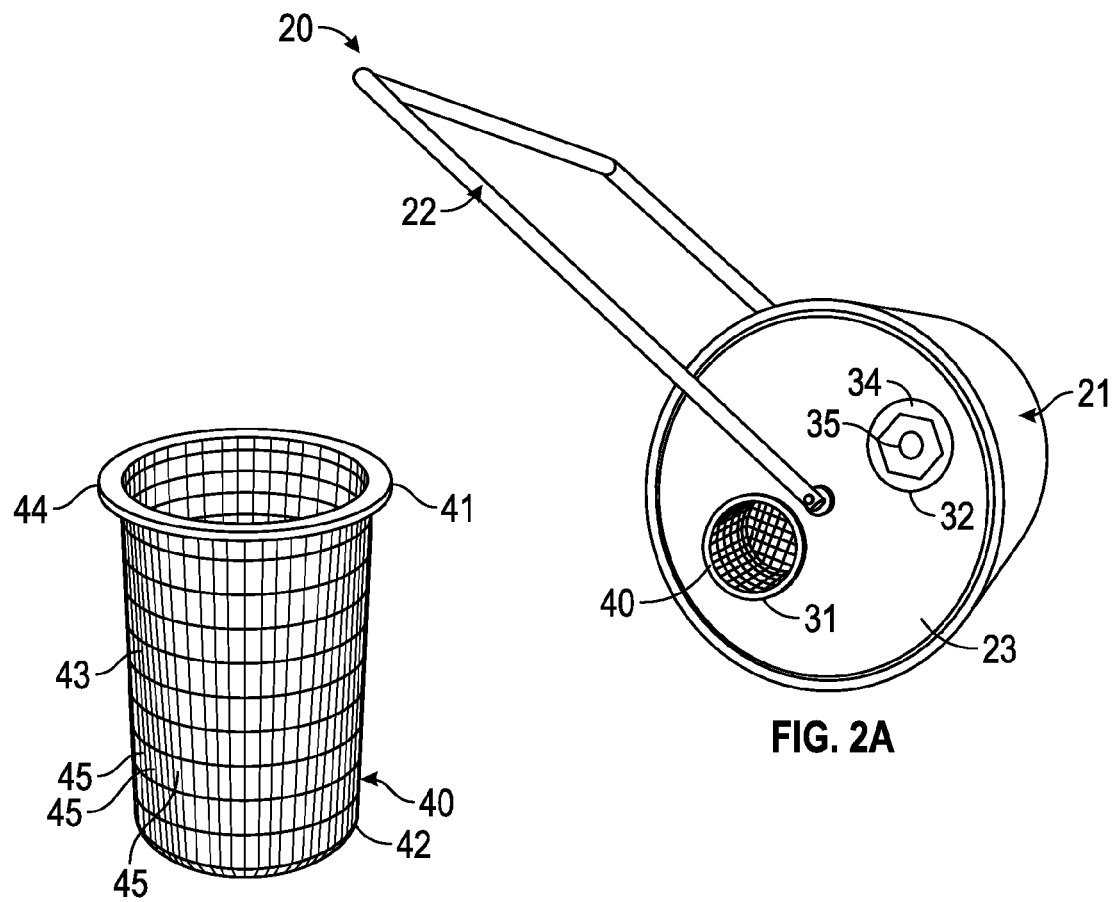
FIG. 2A
FIG. 2B

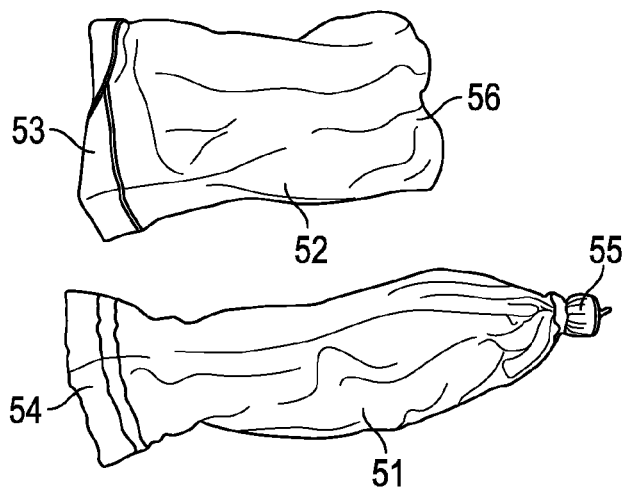
FIG. 3D
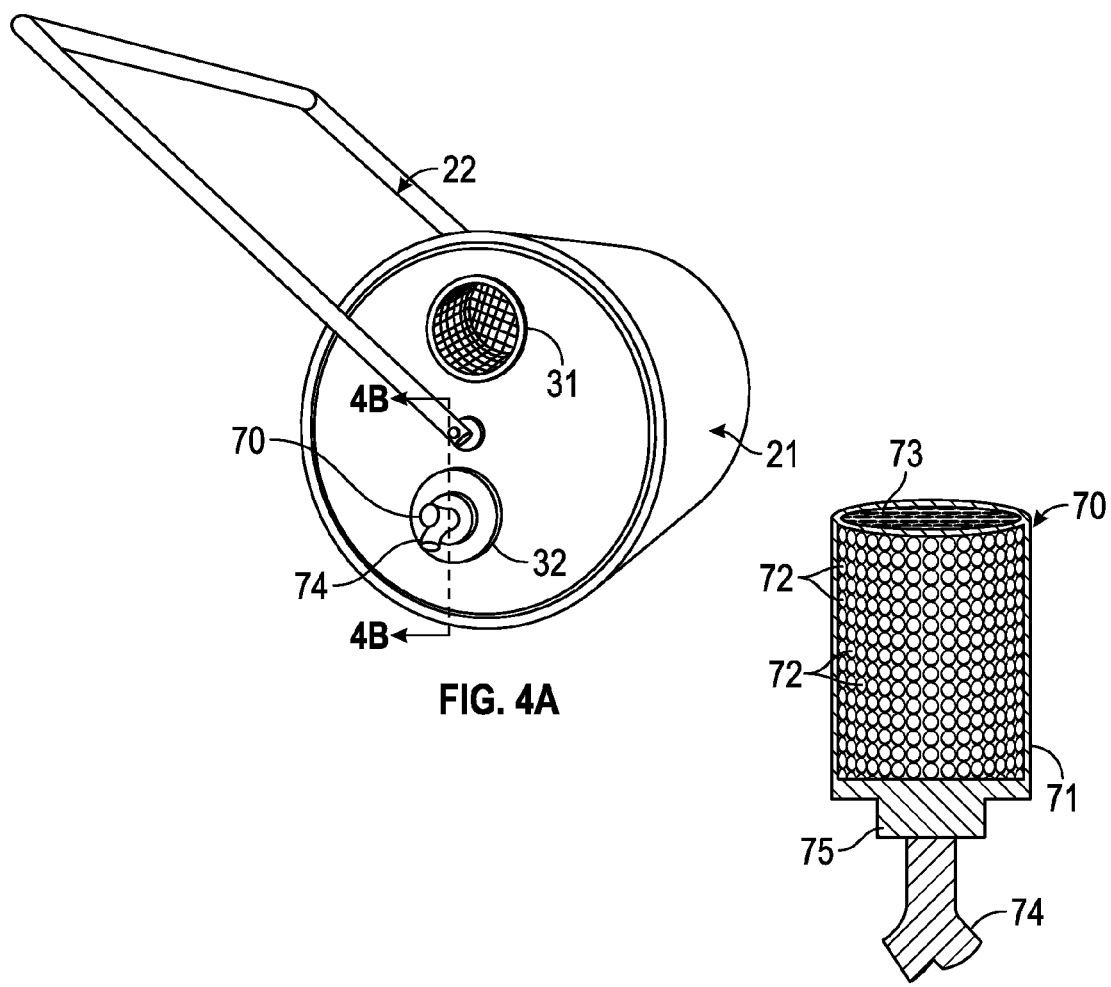
FIG. 4A
FIG. 4B

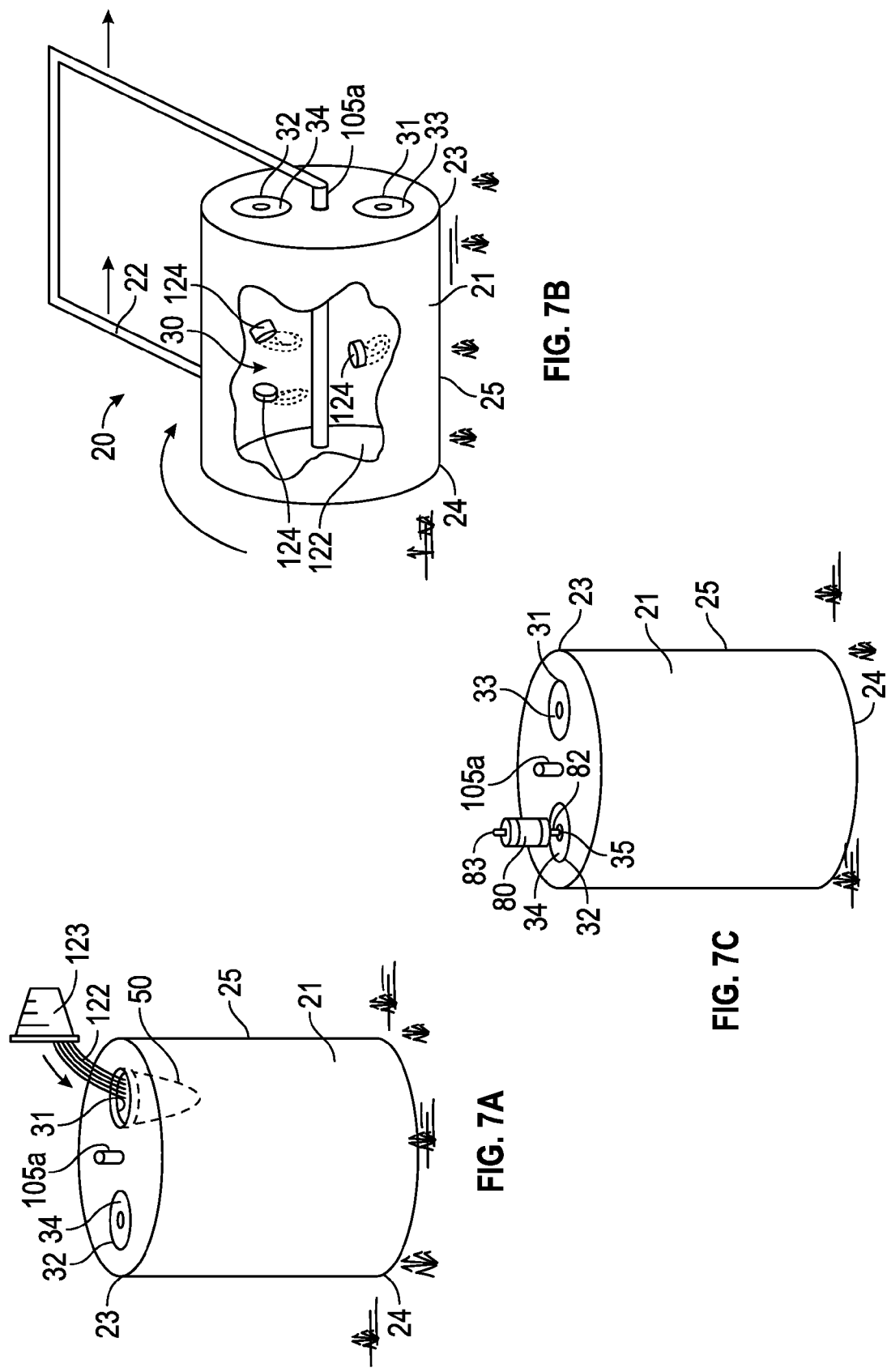

WATER TREATMENT AND CONVEYANCE APPARATUS

TECHNICAL FIELD

The present invention relates generally to water purification methods and apparatuses, and more particularly to portable water purification apparatuses.

BACKGROUND

Access to safe water is vitally important to the health, stability, and development of impoverished regions. Nearly half of the population of the developing world suffers from illnesses caused by a lack of access to safe water and sanitation. In rural communities with limited supplies of safe water, people suffer not only from waterborne illnesses but also from malnourishment caused by food shortages, because a lack of safe water inhibits the cultivation of healthy crops for food.

One factor behind the shortage of safe water in impoverished regions is a lack of infrastructure. Without reliable plumbing, electricity, and roads, it can be impossible to maintain a supply of clean water for everyday activities. Inhabitants of impoverished regions currently spend large amounts of time obtaining water. Because water is fairly heavy, a limited amount can be carried by an individual, usually a woman, in a single trip. Trips to fetch water can be several miles, and several trips may have to be made. This can be incredibly physically burdensome on the individual and also leaves little time for the individual to work in a job or care for family members.

BRIEF DESCRIPTION OF THE DRAWINGS

Referring to the drawings:

FIG. 1 is a perspective view of a water treatment and conveyance apparatus illustrated arranged according to the principle of the invention, including a rotating barrel, a handle, and caps applied to openings enclosing the barrel, and as used in the field;

FIG. 2A is a perspective view of the water treatment and conveyance apparatus of FIG. 1, illustrating an embodiment of an inlet filter applied to one of the openings; and FIG. 2B is a perspective view of the inlet filter of FIG. 2A;

FIGS. 3A-3D are selected top views of an alternate embodiment of the inlet filter of FIG. 2A;

FIG. 4A is a perspective view of the water treatment and conveyance apparatus of FIG. 1, illustrating an embodiment of an outlet filter applied to one of the openings;

FIG. 4B is a sectional view of the outlet filter of FIG. 4A taken along the line 4-4 in FIG. 4A;

FIGS. 7A-7E are views showing a sequence of operational steps of the water treatment and conveyance apparatus treating, conveying, and dispensing water; and FIG. 7E shows the bottom holes for dispensing water.

SUMMARY OF INVENTION

Figure 3A:
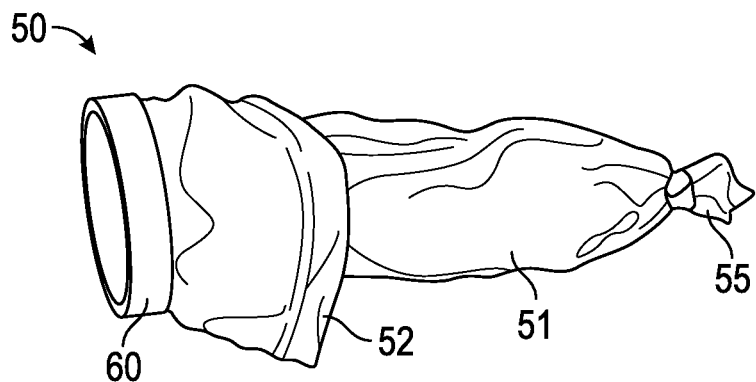
Figure 3B:
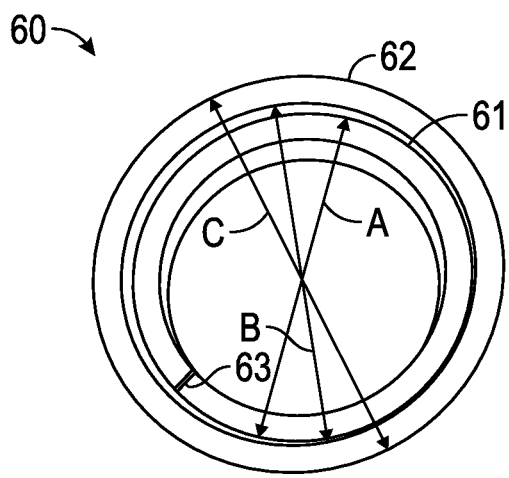
Figure 3C:
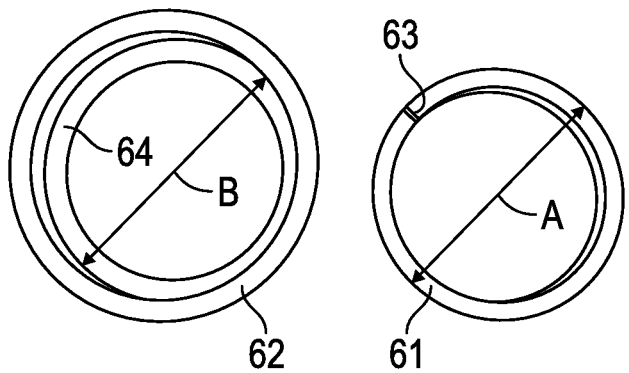

In one embodiment there is a water treatment and conveyance apparatus that includes a barrel with two ends, each with an indentation to accommodate a handle. The handle is a heavy-duty material and has two side members, a transverse grip member and two transverse support members that fit securely into the indentations of the barrel ends. One end of the barrel (the top) has at least one hole, the hole accommodating a removable cap, a removable inlet filter of mesh to screen out particles from entering water, or an outlet filter. With this treatment and conveyance apparatus, the handle is attached to both ends of the barrel in the indentations and the barrel is rolled and pulled to a water source and back to the puller's abode.

Optionally, the water treatment and conveyance apparatus has a barrel top with two holes, a first hole accommodating a removable cap or a removable inlet filter to screen out particles from the entering water, and a second hole accommodating a removable cap and an outlet filter. Optionally, the first and second holes are threaded. The cap in the second hole can be a buttress cap with an internal threaded hole and a threaded plug. The outlet filter has a housing, a threaded end for inserting into the second hole of the top, filtration material, and a spigot for dispensing water. The outlet filter filtration material can be nylon, cotton, woven material, knit material, ceramic, fabric, strings, chlorine, iodine, moringa, carbon or a combination thereof.

In another embodiment, there is provided a method of treating and conveying water. In this method, there is provided a water treatment and conveyance apparatus having a barrel with two ends, each with an indentation to accommodate a handle. The handle is a heavy-duty material and has two side members, a transverse grip member and two transverse support members that fit securely into the indentations of the barrel ends. One end of the barrel (the top) has at least one hole, the hole accommodating a removable cap, a removable inlet filter of mesh to screen out particles from entering water, or an outlet filter. The next steps include a. capping the at least one hole; b. inserting the handle's two transverse support members into the indentations on both ends of the barrel; c. pulling the transverse grip member to roll the barrel to a water source; d. at the water source, removing the handle from the barrel; e. removing the cap of the hole; f. placing the mesh inlet filter into the hole; g. pouring water into the hole with inlet filter to fill the barrel; h. removing the mesh inlet filter; i. inserting a cleansing material; j. capping the hole; k. inserting the handle's two transverse support members into the indentations on both ends of the barrel; l. pulling the transverse grip member to roll the barrel to a user's site; m. at the user's site, removing the handle from the barrel; n. removing the cap of the second hole; o. inserting attaching the outlet filter; and p. turning the barrel on its side or upside down.

Optionally, the barrel top is provided with two holes, a first hole accommodating a removable cap or a removable inlet filter to screen out particles from the entering water, and a second hole accommodating a removable cap and an outlet filter. Optionally, the at least one hole is threaded, and capping and removing the cap also consist of threading and de-threading the cap. Alternately the cap in the second hole is a buttress cap with an internal threaded hole and a threaded plug. The outlet filter which is inserted and removed has a housing, a threaded end for inserting into the second hole of the top, filtration material, and a spigot for dispensing water. The outlet filter filtration material can be nylon, cotton, woven material, knit material, ceramic, fabric, strings, chlorine, iodine, moringa, carbon and a combination thereof. The cleansing chemical can be chlorine, iodine, Moringa (an African antibacterial), other anti-bacterials, antivirals, anti-parasitic chemicals or a combination thereof, and more preferably chlorine tablets.

DETAILED DESCRIPTION

One of the inventors traveled in Africa and noticed that not only do people not have clean drinking water, but they frequently have to walk a mile each way each day just to obtain that water. Besides a lack of plumbing, they lack a transportation system on which to carry heavy water jugs. The obtained water is usually not purified. Further there is little storage of water for human use, as it is too heavy to carry much at one time.

We attach a purification system to the transportation system. The inventive water apparatus can be made from readily available recyclable materials. Different mechanisms can be used to remove the handle so that the barrel can be turned on an end for filling and dispensing.

We devised a complete system for obtaining water in that more water can be obtained for the same effort and the water is purified by the time it reaches its home.

Reference now is made to the drawings, in which the same reference numbers are used throughout the different figures to designate the same components. FIG. 1 illustrates a water treatment and conveyance apparatus 20, which may alternately be referred to herein as "the apparatus" 20 for brevity. The apparatus 20 includes a barrel 21 mounted for rotation to a handle 22.

The barrel 21 includes a top 23, an opposed bottom 24, and a continuous cylindrical sidewall 25 extending between the top 23 and bottom 24. The top 23, bottom 24, and sidewall 25 have an outer surface 26 and an opposed inner surface 27. The inner surface 27 of the barrel 21 bounds and defines a reservoir 30 within the barrel in which a fluid, such as water, is contained for treatment during conveyance over a distance to be traveled by a user dragging or pulling the apparatus 20. The barrel 21 is constructed of a material or combination of materials having rigid, rugged, and durable material characteristics, and having a low weight, such as plastic or sheet metal, which provides the barrel 21 with a low moment of inertia as the barrel 21 rolls during conveyance.

The top 23 of the barrel 21 is formed with two identical circular openings 31 and 32, although the openings need not be identical and alternately there is only one opening. The openings 31 and 32 extend through the top 23 of the barrel 21 from the outer surface 26 to the inner surface 27 and lead to and are in fluid communication with the reservoir 30. Each of the openings 31 and 32 have threaded inner sidewalls so that the openings 31 and 32 are adapted to receive threaded accessories for coupling to the barrel 21. As shown in FIG. 1, caps 33 and 34 are threadably secured to the openings 31 and 32, respectively, to completely enclose and seal the reservoir 30, although the openings need not be identical and alternately there is only one opening hole 35 through the center of the cap 34, and a threaded plug 36 is threadably secured in the threaded hole 35 to define a continuous, fluid-impervious surface across the cap 34.

The apparatus 20 includes means for filtering water as water is applied to and dispensed from the barrel 21. With reference now to FIG. 2A and FIG. 2B, the opening 31 is adapted to receive an inlet filter 40. The inlet filter 40 is a permeable cylindrical container or basket having an open top 41, an opposed permeable bottom 42, a permeable sidewall 43 extending between the top 41 and bottom 42, and an annular flange 44 extending radially outward from the top 41. The inlet filter 40 is constructed of a meshed plastic having a plurality of small openings 45 formed therethrough. The openings 45 allow water and materials smaller than the openings 45 to pass through the filter while retaining materials larger than the openings 45 in the inlet filter 40.

An alternate, preferred embodiment of the inlet filter 40 is shown in FIGS. 3A-3D and is identified as inlet filter 50. The inlet filter 50 includes two nested membranes 51 and 52. The membranes 51 and 52 are each formed as tubes with open ends 53 and 54, respectively, and opposed closed ends 55 and 56, respectively, and are constructed of thin, flexible materials. The membrane 52 is a better filter than the membrane 51 and is placed outside of the membrane 51 so that the open ends 53 and 54 of the membranes 51 and 52 are co-located. A ring assembly 60 located at the open ends 53 and 54 of the membranes 51 and 52 couples the membranes 51 and 52 to each other and allows the inlet filter 50 to be coupled to the barrel 21. The ring assembly 60 includes an inner ring 61 and an outer ring 62. The inner ring 61 has an outer diameter A, and the outer ring 62 has an inner diameter B and an opposed outer diameter C, and the outer diameter A of the inner ring 61 is just less than the inner diameter B of the outer ring 62. The inner ring 61 is severed with a slit 63 to allow the outer diameter A of the inner ring 61 to expand and contract slightly. The outer ring 62 has an annular, inwardly-directed lip 64 at the top of the outer ring 62. In operation, the inner ring 61 is placed around the open ends 53 and 54 of the membranes 51 and 52, encircling the membranes 51 and 52. The openings are drawn over the inner ring 61 around the outer diameter A. The outer ring 62 is applied over the membranes 51 and 52 secured over the inner ring 61, with the inwardly-directed lip 64 of the outer ring 62 opposed from the closed ends 55 and 56 of the membranes 51 and 52. The outer ring 62 is applied over the membranes 51 and 52 on the inner ring 61 in a press-fit engagement to secure the membranes 51 and 52 in the ring assembly 60.

The filter is constructed from a fabric or combination of fabrics having good filtering characteristics, such as cotton, nylon, and like materials. The fabric is woven or knit. In one embodiment there are multiple layers of media which remove contaminants. Each layer of media, consisting of one or more different materials removes different contaminants until the water to be dispensed in potable. These layers include but are not limited to ceramic, fabric, strings, chlorine, iodine, moringa, carbon and a combination thereof. Additionally, one having skill in the art will readily appreciate that although the inlet filter 50 has been described as including two membranes, there can be one or more membranes.

There are numerous possible embodiments of the inlet filter, the inlet filter includes one or more than two membranes, as needed in the situation depending on factors such as the dirtiness of the source water and the potential uses of the treated water. The inlet filter can include a ceramic filter (with a pore size of about 10 nm) to remove even the smallest contaminants, such as bacteria, viruses and parasites.

In yet another embodiment, the inlet filter is not provided, nor is the outlet hole. In this embodiment, water can be filtered of leaves and other particles when being dispensed. In yet another embodiment, there is only one hole in the top of the barrel, in which case, the inlet filter is attached during barrel filling, and the outlet filter is attached to the same hole during dispensing water.

With reference now to FIGS. 4A and 4B, the opening 32 is adapted to receive an outlet filter 70. The outlet filter 70 is a cylindrical housing 71 containing densely packed carbon grains or beads 72 each having a high surface area available to attract and receive heavy metals and other contaminants. The housing 71 has a permeable inner end 73 though which water may pass from the reservoir 30 to the outlet filter 70, and a spigot 74 coupled to an opposed outer end 75 to dispense water.

Figure 5A:
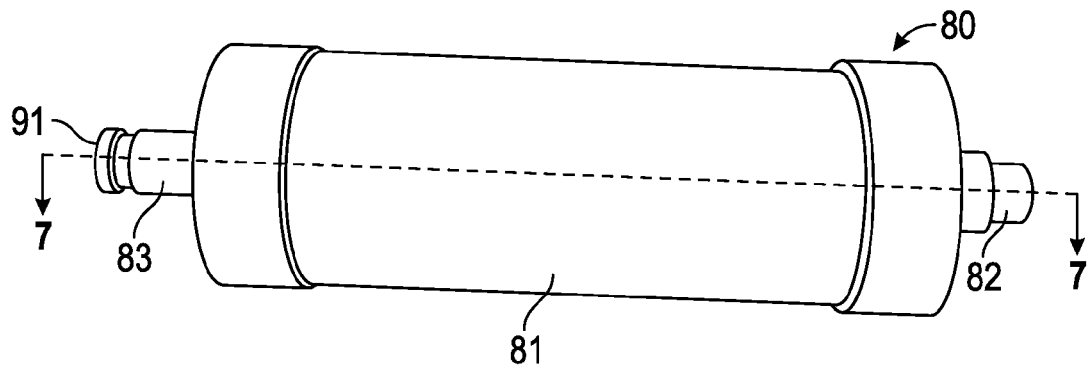
FIGS. 5A-5C are views of an alternate embodiment of the outlet filter of FIG. 4A.
Figure 5B:
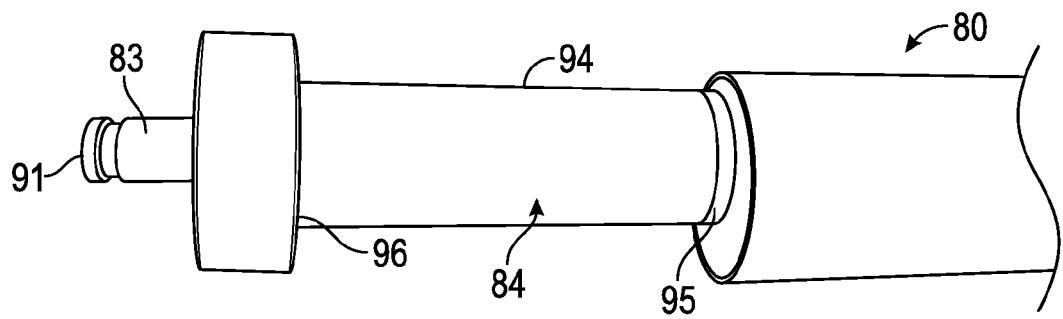
Figure 5C:
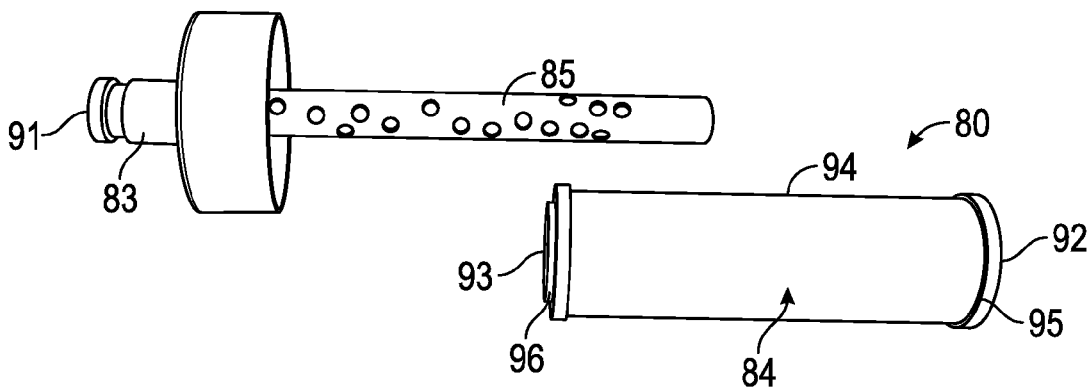

An alternate embodiment of the outlet filter 70 is shown in FIGS. 5A-5C and is identified as outlet filter 80. The outlet filter 80 includes a housing 81, a top 82, and an opposed bottom 83. The housing 81, top 82, and bottom 83 cooperate to define a fluid impervious chamber housing a cylindrical carbon filter membrane 84 supported on a coaxial central core 85. The top 82 is an upstream end of the outlet filter 80 and carries a threaded stub 86 formed with an internal conduit 90 for the transmission of water into the outlet filter 80. The bottom 83 is a downstream end of the outlet filter 80 and carries a drain valve 91 for the adjustable transmission of water out of the outlet filter 80 at an adjustable flow rate. The filter membrane 84 has opposed ends 92 and 93 and a permeable filter sidewall 94. Gaskets 95 and 96 seal the ends 92 and 93 of the filter membrane 84, so that water filling the outlet filter 80 passes into the central core 85 only through the sidewall 94 of the filter membrane 84. The central core 85 is a rigid, open-ended tube with perforations 100 formed therein, coupled in fluid communication to the drain valve 91 at the bottom 83 of the outlet filter 80. The open end of the central core 85 is threaded, when the filter membrane 84 is applied to the central core 85, a threaded cap is threaded onto the open end, so as to axially tighten the filter membrane 84 on the central core 85, and seal the gaskets 95 and 96 onto the ends 92 and 93 of the filter membrane 84. The threaded cap is threadably secured to the central core 85 so that the filter membrane 84 may be periodically replaced.

Returning to FIG. 1, the handle 22 is useful for dragging or pulling the apparatus 20 so that the barrel 21 rotates as the barrel 21 is pulled. The handle 22 is constructed from a material having stiff, rigid, rugged, and durable characteristics, such as tubular or solid steel. The handle 22 is a framework including opposed longitudinal side members 101 and 102, a transverse grip member 103, and a transverse support member 104 proximate to the barrel 21.

We have experimented with numerous handles, including a rope handle. The rope was attached through the entire plastic welded tubing that is part of the barrel. Alternately we strung the rope through a piece of PVC pipe, tying a knot so that the PVC pipe did not move. Then the PVC pipe was gripped.

Another pulling method required a piece of metal that goes through the entire plastic welded tubing that is part of the barrel. The metal piece had an eyelet screw metal welded to each side. Then the rope was tied to each eyelet screw. A piece of PVC that has knots tied to prevent movement of the PVC pipe was also useful as a grip. Rather than a rope, a handle consists of three metal bars as to make a "C". At each end a caliper is useful to allow the user to more easily attach and remove the handle. Additionally the user can use a pin system.

Another hand design involved using one solid handle without pins, etc. Essentially, it is the same shape as the other handles. However, rather than unclipping, the user pulls on a continuous piece that comes out of the barrel.

A cylindrical sleeve having opposed ends extends through the barrel 21 with one end of the sleeve formed integrally with the top 23 of the barrel and the other end formed integrally with the bottom 24 of the barrel 21. In other embodiments, the ends of the cylindrical sleeve are welded or adhered to the top and bottom 23 and 24 so as to preserve the fluid-impervious character of the barrel 21. The sleeve is adapted to receive the end of axle 105a. The axle 105a is a short, elongate cylindrical member or pin, approximately four inches in length. The axle 105a fits into the barrel end in a loose engagement.

Figure 6:
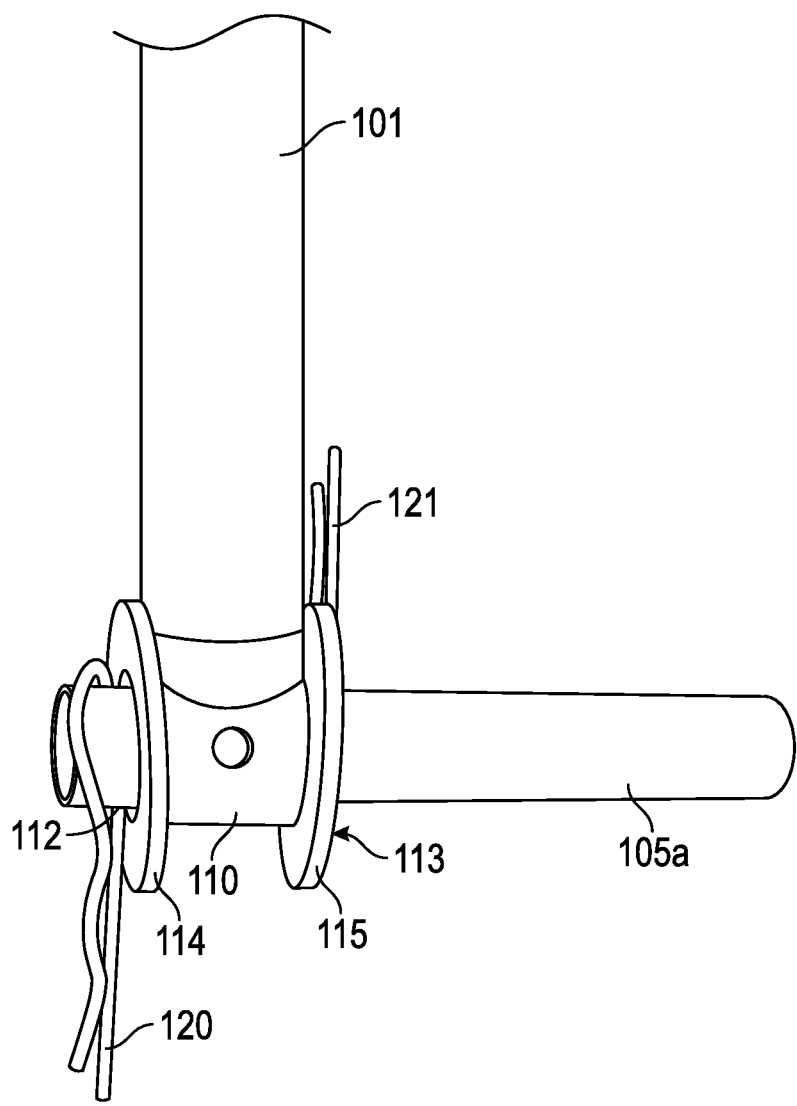
FIG. 6 is an enlarged top plan view of a portion of the handle of FIG. 1.

The end of axle 105a is coupled to the side member 101 so as to define an axis of rotation of the barrel 21. With reference now to FIG. 6, which is a detailed view of a portion of the side member 101 and the axle 105a, it can be seen that an annular plain bearing 110 is disposed at an end of the side member 101, and the axle 105a extends through the plain bearing 110. The axle 105a is formed with two through-holes 112 and 113 proximate to the plain bearing 110 on either side of the plain bearing 110. Flat washers 114 and 115 are carried on the axle 105a on either side of the plain bearing 110 and held in place between the plain bearing 110 and the through-holes 112 and 113, respectively, by pins 120 and 121 applied to the through-holes 112 and 113. The pins 120 and 121 are roll pins, cotter pins, clevis pins, or like fasteners for releasably securing an item to a rotating shaft. Mounted in this way, the plain bearing 110 can rotate on the axle 105a, and the axle 105a can rotate within the sleeve, to allow the barrel 21 to rotate as the barrel 21 is pulled. Rotation will occur at the less resistant coupling of the axle 105a and sleeve engagement and the axle 105a and plain bearing 110 engagement. In other embodiments, the axle 105a is replaced by a single solid axle extending across the barrel 21. One having reasonable skill in the art will understand that another plain bearing similar to the plain bearing 110 is carried on the axle 105a on the other side of the handle 22 at side member 102 at the bottom 24 of the barrel 21.

Operation of the apparatus 20 will now be described with reference to a preferred embodiment of the apparatus 20. The apparatus 20 is rolled from a person's home to a water source and back. The apparatus 20 is useful for conveying water and simultaneously treating and purifying the water. To use, the apparatus 20 is pulled, such as by hand, by animal, or behind a vehicle (as shown in FIG. 1) from a starting location to a water source, such as a well or river. The caps 33 and 34 are threadably secured in the openings 31 and 32, respectively, to prevent the ingress of dirt or other material into the reservoir 30 while the apparatus 20 is being pulled. Once the apparatus 20 is brought to the water source, the handle 22 is disconnected from the axle 105a by removing the pins 120 and 121 and freeing the plain bearing 110 from the end of axle 105a. The barrel 21, free of the handle 22, is then tilted into an upright position with the bottom 24 resting on the ground and the top 23 directed upwards, as shown in FIG. 7A. The cap 33 is removed from the opening 31 and the inlet filter 50 is placed into the opening 31. The outer diameter C of the outer ring 62 of the ring assembly 60 of the inlet filter 50 is greater than the internal diameter of the opening 31 so that the inlet filter 50 is supported at the top 23 of the barrel 21 in the opening 31 and prevented from falling into the reservoir 30. Because the openings 31 and 32 are identical, one having reasonable skill in the art will readily appreciate that, although the above description refers to the inlet filter 50 being applied to the opening 31, the inlet filter 50 may also be applied to the opening 32. Moreover, one having reasonable skill in the art will readily appreciate that two inlet filters 50 may be applied to each of the openings 31 and 32 so that two inlet filters 50 depend from the top 23 of the barrel 21. In this way, more water can be poured into the barrel 21. This description, however, refers to only a single inlet filter 50 applied to the opening 31.

As shown in FIG. 7A, with the barrel 21 upright, water 122 from the water source is poured into the inlet filter 50 by a bucket 123 or other similar means. The inlet filter 50 accommodates a high flow rate of water 122 so as to allow a large amount of water 122 to be poured into the barrel 21, filling the reservoir 30. The water 122 being poured into the inlet filter 50 passes through the inlet filter 50 without delay and without backing up. As water 122 passes through the inlet filter 50, the inlet filter 50 traps and holds material which is larger than the pores in the membranes 51 and 52 in the inlet filter 50, so as to filter out larger material from entering the reservoir 30.

Exemplary filtered materials are dirt, leaves and rocks. The membrane 51 filters approximately sand sized material, and the membrane 52 removes smaller material. Only very fine material is able to pass through the inlet filter 50 into the reservoir 30.

When a desired amount of water 122 has been added to the barrel 21, the inlet filter 50 is removed. A cleansing chemical is then added to the water 122 in the barrel 21 through the opening 31. A preferred cleansing chemical is chlorine-based activated tablets 124, as depicted in FIG. 7B, but alternately includes another cleansing agent for killing disease-causing contaminants that is also safe to consume in appropriate dosages. Other useful chemicals include but are not limited to iodine, Moringa (an African antibacterial), other anti-bacterials, antivirals, anti-parasitic chemicals or a combination thereof. After the appropriate quantity of chemicals tablets 124 are added to the water 122, the cap 33 is threadably secured to the opening 31. The barrel 21 is then tipped over on its side so that the sidewall 25 is on the ground and the axle 105a is parallel to the ground, as shown in FIG. 7B. The handle 22 is coupled to the axle 105a, and the apparatus 20 is then pulled back to the starting location. As the apparatus 20 is pulled, the barrel 21 rotates about the axle 105a. The sidewall 25 of the barrel 21 rolls along the ground, and may include a protective sleeve or other layer for protection of the sidewall 25 from the ground or for enhanced traction with the ground. As the barrel 21 rotates about the axle 105a, the tablets 124 in the barrel 21 roll and disperse throughout the reservoir 30, dissolving and releasing the active chemical and cleaning the water 122 in the barrel 21, as shown in FIG. 7B. On a typical water-seeking journey, there is enough time for the chemicals to kill the disease-causing contaminants.

Upon returning to the starting location, the handle 22 is again decoupled from the axle 105a. The barrel 21 is moved to the upright position with the bottom 24 resting on the ground and the top 23 directed upwards. The threaded plug 36 is removed from the cap 34, and the outlet filter 80 is applied to the threaded hole 35, as shown in FIG. 7C. The threaded stub 86 at the top 82 of the outlet filter 80 is threadably secured to the threaded hole 35, coupling the outlet filter 80 to the barrel 21 in fluid communication with the reservoir 30. The outlet filter 80 projects outwardly away from the top 23 of the barrel 21 or optionally inward for greater protection in use.

With the outlet filter 80 secured in the top 23 of the barrel 21, the barrel 21 is then laid back down with the sidewall 25 in contact with the ground. A stand 140 is placed adjacent to the barrel 21. The stand, shown in FIGS. 7D and 7E, is a framework including a lower ring member 141, an upper ring member 142, a plurality of vertical members 143 extending between the lower and upper ring members 141 and 142, and a band 144 of reinforcing material wrapped around and encircling the vertical members 143 at a location generally intermediate to the lower and upper ring members 141 and 142. The upper ring member 142 is sized and shaped to be received against the top 23 of the barrel 21, just inside a projecting lip 145 formed around the perimeter of the top 23. On the ground, the upper ring member 142 is placed against the top 23 of the barrel 21 and a strap 146 is placed around the barrel 21 and the stand 140. The strap 146 extends vertically over the bottom 24 of the barrel 21, down the sidewall 25, and around the top 23 of the barrel 21 and the upper ring member 142, binding the barrel 21 to the stand 140. The barrel 21 and stand 140 are then moved together so that the barrel is in an elevated position in which the bottom 24 is above the top 23 and the top 23 is spaced above the ground, as shown in FIGS. 7D and 7E. In this position, when the drain valve 91 is opened, water 122 in the reservoir 30 passes in a gravity-feed arrangement through the threaded hole 35 into the threaded stub 86 and into the housing 81 of the outlet filter 80. The water 122 entering the outlet filter 80 includes only very fine material, the larger material having been removed from the water earlier by the inlet filter 50.

Figure 7F:
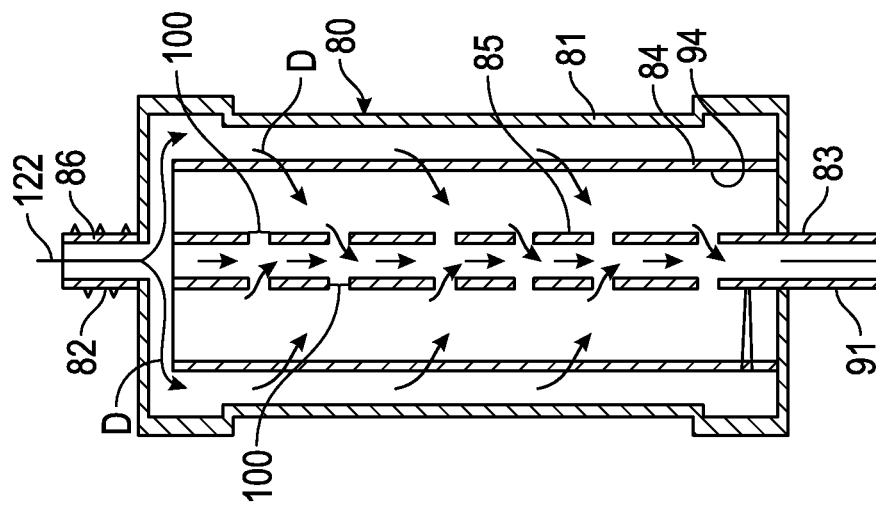
FIG. 7F is a sectional view of the outlet filter of FIGS. 5A-5C taken along the line 7-7 in FIG. 5A illustrating the flow of water through the outlet filter.
Figure 7E:
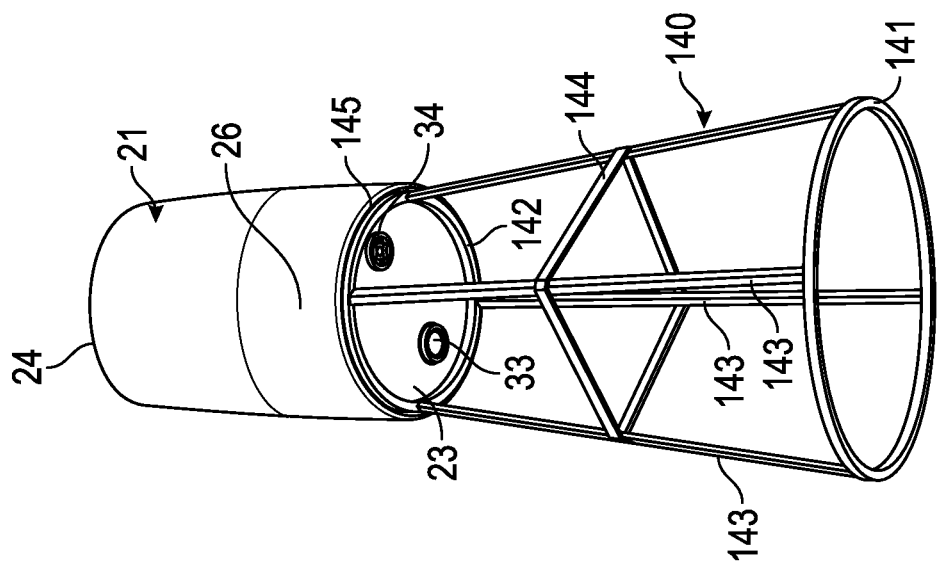
Figure 7D:
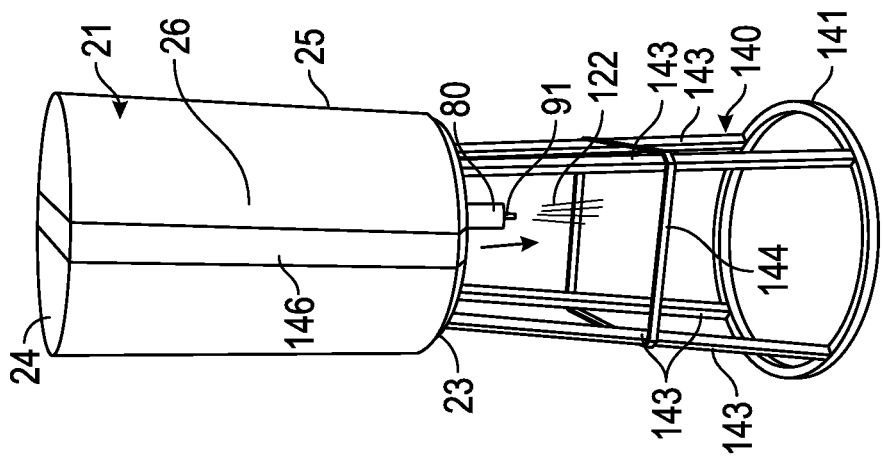

As shown in FIG. 7F, water 122 passes into the outlet filter 80 through the threaded stub 86 at the top 82. The water 122 follows a path of travel through the outlet filter 80 as generally indicated with the lines D in FIG. 7F. The water 122 passes into the top 82 of the outlet filter 80 and flows through the outlet filter 80 between the housing 81 and the cylindrical carbon filter membrane 84. The water 122 passes through the sidewall 94 of the filter membrane 84 and into a space defined between the filter membrane 84 and the central core 85. As the water 122 passes through the filter membrane 84, the water 122 is further purified of heavy metals. The water 122 then passes through the perforations 100, down the central core 85 toward the bottom 83, and out the drain valve 91. The water 122 dispensed from the drain valve 91 is potable.

When the water 122 in the reservoir is depleted, the barrel 21 is lowered to an upright position, the outlet filter 80 is removed from the opening 32, and the threaded plug 36 is threadably secured in the cap 34 in the opening 32. The barrel 21 is then moved so that the sidewall 25 is on the ground, the handle 22 is coupled to the axle 105a, and the apparatus 20 is ready to be pulled back to a water source for repeated use.

Optionally there is supplied a capped air intake hole (not shown) on the end of the barrel away from the outlet. The air intake hole is optionally filtered.

Another method of dispensing water utilizes a hand or foot pump. In this embodiment, the barrel stays on its side. The pump is either attached to the other opening in the barrel, or to an air hole in the top of the barrel, such that it is above the water level. As the user pumps, the internal pressure increases and increases the rate of water flow out of the system. When water is emptied from this embodiment, the user screws back on all lids and caps and then attaches the handle and once more pushes or pulls the barrel back to the water source.

Alternately, our system can be used to obtain water even if an inlet filter, outlet filter or both filters are not available.

The present invention is described above with reference to a preferred embodiment. However, those skilled in the art will recognize that changes and modifications may be made in the described embodiment without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

The invention claimed is:

1. A water treatment and conveyance kit, the kit comprising
   a) a barrel with two ends, each with an indentation to accommodate a handle,
   b) a handle comprising a heavy-duty material, two side members, a transverse grip member and two transverse support members that fit securely into the indentation of the barrel ends,
   c) one end of the barrel having at least one hole,
   d) at least one removable cap for covering the at least one hole,
   e) a removable inlet filter of mesh to screen out particles from entering water, and
   f) an outlet filter;
   whereby the handle is attached to both ends of the barrel in the indentations and the barrel is rolled and pulled to a water source and back to the puller's abode.

2. The water treatment and conveyance kit of claim 1 wherein the at least one hole comprises a first and a second hole, the first hole having a removable cap of the at least one removable cap or the removable inlet filter screen to screen out particles from the entering water, and the second hole having a removable cap of the at least one removable cap and the outlet filter.

3. The water treatment and conveyance kit of claim 2 wherein the first and second holes are threaded.

4. The water treatment and conveyance kit of claim 2 wherein the cap in the second hole is a buttress cap with an internal threaded hole and a threaded plug.

5. The water treatment and conveyance kit of claim 2 wherein the outlet filter comprises a housing, a threaded end for inserting into the second hole of the top, filtration material, and a spigot for dispensing water.

6. The water treatment and conveyance kit of claim 5 wherein the outlet filter filtration material is selected from nylon, cotton, woven material, knit material, ceramic, fabric, strings, chlorine, iodine, moringa, carbon and a combination thereof.

7. A method of treating and conveying water, the method comprising
  a) providing a water treatment and conveyance kit comprising:
    i) a barrel with two ends, each with an indentation to accommodate a handle,
    ii) a handle comprising a heavy-duty material, two side member, a transverse grip member and two transverse support member that fit securely into the indentations of the barrel ends,
    iii) one end of the barrel having at least one hole,
    iv) at least one removable cap for covering the at least one hole,
    v) a removable inlet filter of mesh to screen out particles from entering water, and
    vi) an outlet filter;
  b) capping the at least one hole with at least one cap of the at least one removable cap;
  c) inserting the handle's two traverse support members into the indentations on both ends of the barrel;
  d) pulling the traverse grip member to roll the barrel to a water source;
  e) at the water source, removing the handle from the barrel;
  f) removing a cap from the at least one hole to provide an open hole;
  g) placing the mesh inlet filter into the open hole;
  h) pouring water into the open hole with inlet filter to fill the barrel;
  i) removing the mesh inlet filter;
  j) inserting a cleansing material;
  k) capping the open hole;
  l) inserting the handle's two transverse support members into the indentations on both ends of the barrel;
  m) pulling the transverse grip member to roll the barrel to a user's site;
  n) at the user's site, removing the handle from the barrel;
  o) removing a cap from the at least one hole to provide an open hole;
  p) inserting and attaching the outlet filter to the open hole; and
  q) turning the barrel on its side or upside down.

8. The method of treating and conveying water of claim 7 wherein at least one hole comprises a first and a second hole, the first hole having a removable cap of the at least one removable cap or the removable inlet filter to screen out particles from the entering water, and a second hole having a removable cap of the at least one removable cap and an outlet filter.

9. The method of treating and conveying water of claim 8 wherein the first and second holes are threaded.

10. The method of treating and conveying water of claim 8 wherein the cap in the second hole is a buttress cap with an internal threaded hole and a threaded plug.

11. The method of treating and conveying water of claim 7 wherein the outlet filter comprises a housing, a threaded end for inserting into the second hole of the top, filtration material, and a spigot for dispensing water.

12. The method of treating and conveying water of claim 11 wherein the outlet filter filtration material is selected from nylon, cotton, woven material, knit material, ceramic, fabric, strings, chlorine, iodine, moringa, carbon and a combination thereof.

13. The method of treating and conveying water of claim 7 wherein the cleansing chemical is selected from chlorine, iodine, moringa (an African antibacterial), other anti-bacterials, antivirals, anti-parasitic chemicals or a combination thereof.

14. The method of treating and conveying water of claim 13 wherein the cleansing chemical comprises chlorine tablets.

15. The method of claim 7 wherein step c is performed before step b.

16. The method of claim 7 wherein step f is performed before step d.

17. A method of treating and conveying water, the method comprising
  a) providing a water treatment and conveyance kit comprising
    i) a barrel with two ends, each with an indentation to accommodate a handle,
    ii) a handle comprising a heavy-duty material, two side member, a transverse grip member and two transverse support member that fit securely into the indentations of the barrel ends,
    iii) one end of the barrel having at least one hole,
    iv) at least one removable cap for covering the at least one hole,
    v) a removable inlet filter of mesh to screen out particles from entering water, and
    vi) an outlet filter;
  b) capping the at least one hole with at least one cap of the at least one removable cap;
  c) inserting the handle's two traverse support members into the indentations on both ends of the barrel;
  d) pulling the traverse grip member to roll the barrel to a water source;
  e) at the water source, removing the handle from the barrel;
  f) removing a cap from the at least one hole to provide an open hole;
  g) placing the mesh inlet filter into the open hole;
  h) pouring water into the open hole with inlet filter to fill the barrel;
  i) removing the mesh inlet filter;
  j) capping the open hole;
  k) inserting the handle's two transverse support members into the indentations on both ends of the barrel;
  l) pulling the transverse grip member to roll the barrel to a user's site;
  m) at the user's site, removing the handle from the barrel;
  n) removing a cap from the at least one hole to provide an open hole; and
  o) inserting and attaching the outlet filter to the open hole.

* * * * *